(12) United States Patent
Herzhauser et al.

(10) Patent No.: US 10,029,582 B2
(45) Date of Patent: Jul. 24, 2018

(54) METHOD AND DEVICE FOR OPERATING A MOTOR VEHICLE, MOTOR VEHICLE

(71) Applicant: Robert Bosch GmbH, Stuttgart (DE)

(72) Inventors: Erik Herzhauser, Bad Rappenau—Heinsheim (DE); Sebastian Auracher, Moeglingen (DE); Christoph Junker, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/510,323

(22) PCT Filed: Aug. 24, 2015

(86) PCT No.: PCT/EP2015/069337
§ 371 (c)(1),
(2) Date: Mar. 10, 2017

(87) PCT Pub. No.: WO2016/037838
PCT Pub. Date: Mar. 17, 2016

(65) Prior Publication Data
US 2017/0259696 A1    Sep. 14, 2017

(30) Foreign Application Priority Data
Sep. 10, 2014   (DE) .................. 10 2014 218 077

(51) Int. Cl.
*B60L 15/10*   (2006.01)
*B60L 15/20*   (2006.01)

(52) U.S. Cl.
CPC .......... *B60L 15/2045* (2013.01); *B60L 15/10* (2013.01); *B60L 15/2009* (2013.01);
(Continued)

(58) Field of Classification Search
CPC ...... B60L 15/00; B60L 15/10; B60L 15/2045; B60L 15/2009; B60W 30/00; B60W 30/188; B60W 30/18063
See application file for complete search history.

(56) References Cited

U.S. PATENT DOCUMENTS

| 8,328,681 B2 * | 12/2012 | Kaltenbach | B60K 6/48 |
| | | | 477/5 |
| 8,763,736 B2 * | 7/2014 | Mochiyama | F16H 61/0031 |
| | | | 180/338 |

(Continued)

FOREIGN PATENT DOCUMENTS

| DE | 102007018733 | 10/2008 |
| DE | 102011011345 | 8/2012 |

(Continued)

OTHER PUBLICATIONS

International Search Report for Application No. PCT/EP2015/069337 dated Mar. 30, 2016 (English Translation, 2 pages).

*Primary Examiner* — Yonel Beaulieu
(74) *Attorney, Agent, or Firm* — Michael Best & Friedrich LLP

(57) ABSTRACT

A method is provided for operating a motor vehicle which has at least one electric machine as a driving device. The method includes examining a current driving situation to determine whether a target position can be reached with a target speed by coasting; displaying a message to a driver of the motor vehicle if the target position can be reached by coasting; detecting a reaction time of the driver from the message up to the initiation of a coasting process by the driver; and actuating the electric machine as a generator to generate a deceleration torque if the reaction time exceeds a predefinable limiting value.

8 Claims, 1 Drawing Sheet

(52) U.S. Cl.
CPC ..... *B60L 2240/12* (2013.01); *B60L 2240/421* (2013.01); *B60L 2240/423* (2013.01); *B60L 2240/62* (2013.01); *B60L 2250/12* (2013.01); *B60L 2250/16* (2013.01); *B60L 2260/24* (2013.01)

(56) References Cited

U.S. PATENT DOCUMENTS

| | | | | |
|---|---|---|---|---|
| 9,108,635 | B2 * | 8/2015 | Miyazaki | B60K 6/48 |
| 9,448,082 | B2 * | 9/2016 | Christ | B60W 10/06 |
| 9,802,616 | B2 * | 10/2017 | Horst | B60W 30/188 |
| 2010/0197451 | A1 * | 8/2010 | Kaltenbach | B60K 6/48 |
| | | | | 477/5 |
| 2012/0109478 | A1 * | 5/2012 | Mochiyama | B60W 10/02 |
| | | | | 701/68 |
| 2013/0297124 | A1 * | 11/2013 | Be | G06F 17/00 |
| | | | | 701/22 |
| 2014/0229049 | A1 * | 8/2014 | Horst | B60W 30/188 |
| | | | | 701/22 |

FOREIGN PATENT DOCUMENTS

| | | |
|---|---|---|
| DE | 102011083013 | 3/2013 |
| DE | 102012213321 | 1/2014 |

* cited by examiner

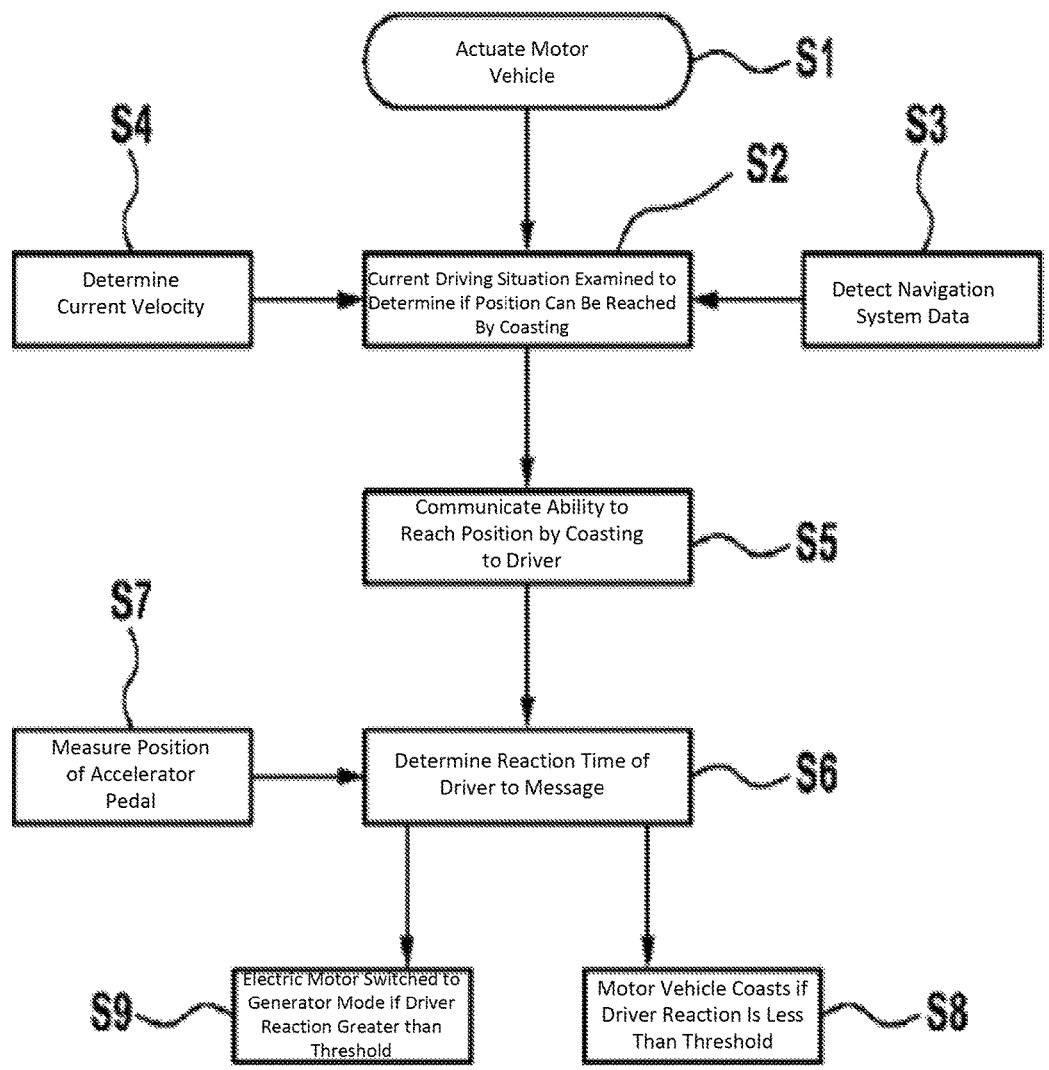

METHOD AND DEVICE FOR OPERATING A MOTOR VEHICLE, MOTOR VEHICLE

FIELD OF THE INVENTION

The invention relates to a method for operating a motor vehicle which has at least one electric machine as a driving device, in which method the driver of the motor vehicle is given a recommendation if he can allow the vehicle to coast in order to reach a predefinable target position.

In addition, the invention relates to a corresponding device and to a motor vehicle.

BACKGROUND OF THE INVENTION

The prior art has disclosed systems which, for the purpose of energy-efficient coasting, for example for coasting events such as speed limits, entries into localities or bends, give the driver of the motor vehicle, on the basis of data of a navigation system, a message as to when he can start the coasting, that is to say can take his foot off the accelerator pedal. For this purpose, the current position of the motor vehicle on a virtual map is determined using the navigation system, and the section of road lying ahead is examined for coasting events using suitable algorithms. If a coasting event is detected, the movement of the motor vehicle is predicted using a model. If the vehicle speed, which is now predicted, at the start of the possible coasting event corresponds, or virtually corresponds, to the actual speed during the coasting event, the driver is given, for example by visual means, a recommendation to release the accelerator pedal. If the driver does not react immediately, this will cause him to have too high a speed at the target position and mean that he must additionally brake in order to reach a desired target speed at the target position.

SUMMARY OF THE INVENTION

The method according to the invention has the advantage that the driver has a relatively large room for maneuver in terms of timing during the implementation of the recommendation "take foot off accelerator pedal". Furthermore, it is ensured by simple means that the motor vehicle has the desired velocity at the target position. The method according to the invention is distinguished by the following steps: firstly, the current driving situation is examined to determine whether a target position can be reached with a target speed by coasting as a function of the current driving situation. If this is the case, a message is displayed to the driver. Furthermore, a reaction time of the driver from the displaying of the message up to the initiation of a coasting process is detected or measured, and if the detected reaction time exceeds a predefinable limiting value, the electric machine is controlled as a generator to generate a deceleration torque. By means of the generator operation of the electric machine it is ensured that if the driver only reacts after a delay, the target speed is reached at a target position without the driver having to activate a brake system of the motor vehicle. By providing a deceleration torque through the electric machine it is also ensured that a brake system which is present in the motor vehicle is not used and as a result low-wear and, in particular, energy-efficient deceleration of the vehicle takes place up to the point where the target speed is reached at the target position.

The deceleration torque is preferably set in such a way that the vehicle is at the target speed at the target position. If the target speed is, for example, the permissible maximum speed of travel through a locality or else a speed of 0 km/h, that is to say the stationary state of the vehicle, the vehicle can therefore in this case coast to a standstill.

According to one advantageous development of the invention there is provision that an accelerator pedal activation by the driver is monitored in order to determine the reaction time. As soon as the driver takes his foot off the accelerator pedal or no longer activates the accelerator pedal, this is evaluated as a reaction of the driver to the message, with the result that the time from the displaying of the message up to a time at which the driver no longer activates the accelerator pedal is detected as the reaction time. This constitutes a particularly simple and cost-effective possible way of determining the reaction time.

In addition, there is preferably provision that the deceleration torque is regulated as a function of the distance of the motor vehicle from the target position and from the current velocity. The deceleration torque is therefore controlled up to the point where the target position is reached, in such a way that the desired target speed is present at the target position. This ensures that even in the case of unforeseen events such as, for example, a bump, tailwind or the like, the velocity at the target position corresponds to the target speed.

Furthermore there is preferably provision that the examination of driving situations is carried out as a function of data of a navigation system of a motor vehicle. By means of the data of the navigation system, in particular the section of road lying ahead is checked, for example, for gradients, curves or the condition of the roadway in order to be able to predict the coasting process particularly precisely.

Additionally or alternatively there is preferably provision that the driving situation is examined as a function of a surroundings sensor of the motor vehicle. In this case, for example, camera sensors which detect road signs or the section of road lying ahead are used to predict the coasting process of the motor vehicle, or to check the plausibility of or to support the prediction which has been carried out by means of the data of the navigation system.

The control unit according to the invention is distinguished by the fact that the method according to the invention is carried out in the case of correct use. Further advantages in the feature result from what has been described above and from the claims.

The motor vehicle according to the invention is distinguished by the control unit according to the invention.

BRIEF DESCRIPTION OF THE DRAWINGS

In the text which follows, the invention will be explained in more detail on the basis of the drawing.

FIG. 1 shows a method for operating a motor vehicle in a flow chart.

DETAILED DESCRIPTION

FIG. 1 shows a flow chart on the basis of which an advantageous method for operating a motor vehicle needs to be explained in more detail. In a step S1, the method is started when the motor vehicle is actuated. In a subsequent step S2, the current driving situation is examined to determine whether a target position with a target speed can be reached solely by coasting. For this purpose, firstly the data of a navigation system are detected in a step S3, in order to determine possible target positions, in particular a possible following target position on the current section of road. Furthermore, by means of the data of the navigation system it is determined what target speed is to be reached at the target position. The target position can therefore be, for example, an entry to a locality at which a reduced velocity is prescribed by law. Likewise, it can be a stop sign at which the vehicle is to come to a standstill. The evaluation in step S2 is also carried out as a function of the current velocity v, which is determined in a step S4, in particular together with a position of the accelerator pedal or with a position of the brake pedal. It is preferably determined in a step S2, only when the brake pedal is not activated, whether, on the basis of the data which is now known, it is possible to reach the target position of the target speed by coasting of the vehicle starting from a specific starting position and a starting speed, which corresponds at least approximately to the current velocity. If this is case this is communicated to the driver of the motor vehicle in a step S5. For this purpose, there is provision, in particular, that this is communicated to the driver visually, acoustically and/or haptically. There is provision, for example, that the driver is given the message about the possible coasting event by means of a display device. It is also possible to provide that an active accelerator pedal is provided which increases a counter pressure which counteracts the activation force of the driver, in order to indicate the coasting event. When the message is displayed in the step S5, a stopwatch also begins to run, which measures the time t which the driver requires to react to the message in a step S6. The reaction is determined, in particular, as a function of the activation of the accelerator pedal. For this purpose, in a step S7 the activation of the accelerator pedal, in particular the position of the accelerator pedal, is measured. As soon as it is detected that the driver is no longer activating the accelerator pedal, the stopwatch is stopped, and in step S6 the reaction time of the driver is detected. The reaction time which is determined is compared with a predefinable limiting value of preferably between 1 second and 2 seconds. If the reaction time is shorter than the predefinable limiting value, then the motor vehicle is made to coast in a step S8, provided that the driver does not activate the accelerator pedal or the brake pedal again.

However, if the reaction time exceeds the predefinable limiting value, in a step S9 an electric machine of the motor vehicle, which is provided as a driving machine, is switched to a generator mode. In this context, a deceleration torque, which is calculated as a function of the current velocity, the distance from the target position and the target speed, is predefined to the electric machine. In particular, in this context, data of the navigation system relating to the section of road which has to be traveled along in order to reach the target position is also taken into account. In this context, the deceleration torque is determined in such a way that the motor vehicle reaches the target speed at the target position. If the driver of the motor vehicle therefore does not immediately follow the message and instead initiates the coasting process at a later time, the method becomes active, in particular in the form of a coasting controller, in order to control the coasting speed using the deceleration torque of the electric machine.

In this context, the deceleration torque is continuously determined in order to reach the desired target speed at the target position. Although the driver has not followed the recommendation or the message immediately, the motor vehicle nevertheless has a velocity corresponding to the target speed at the target position. Since no braking interventions are necessary with a mechanical brake for this deceleration of the motor vehicle, wear-free deceleration of the motor vehicle is ensured. Furthermore, during the generator mode of the electric machines an electric store of the motor vehicle is charged, with the result that the deceleration energy can be stored and can be used to drive the motor vehicle at a later time.

The motor vehicle preferably has a hybrid drive device which, apart from the electric machine, also has an internal combustion engine and, if appropriate, a further electric machine as driving machines. Furthermore, the motor vehicle also has, preferably as is customary, a conventional, in particular hydraulic braking system for generating a braking torque when the brake pedal is activated.

What is claimed is:

1. A method for operating a motor vehicle which has at least one electric machine as a driving device, the method comprising:
   examining a current driving situation to determine whether a target position can be reached with a target speed by coasting;
   displaying a message to a driver of the motor vehicle if the target position can be reached by coasting;
   detecting a reaction time of the driver from the message up to the initiation of a coasting process by the driver; and
   actuating the electric machine as a generator to generate a deceleration torque if the reaction time exceeds a predefinable limiting value.

2. The method as claimed in claim 1, wherein the deceleration torque is set in such a way that the vehicle is at the target speed at the target position.

3. The method as claimed in claim 1, wherein an accelerator pedal activation by the driver is monitored in order to determine the reaction time.

4. The method as claimed in claim 1, wherein the deceleration torque is regulated as a function of the distance of the motor vehicle from the target position and from the current velocity.

5. The method as claimed in claim 1, wherein the examination is carried out as a function of data of a navigation system of the motor vehicle.

6. The method as claimed in claim 1, wherein the examination is carried out as a function of a surroundings sensor system of the motor vehicle.

7. A device for operating a motor vehicle which has at least one electric machine as a driving device, the device comprising a control unit configured to carry out the method as claimed in claim 1.

8. A motor vehicle having at least one electric machine as a driving device, and further comprising a control unit as claimed in claim 7.

* * * * *